US009006932B2

(12) United States Patent
Shimura et al.

(10) Patent No.: US 9,006,932 B2
(45) Date of Patent: Apr. 14, 2015

(54) POWER SUPPLY SYSTEM AND ELECTRONIC DEVICE

(75) Inventors: Jusuke Shimura, Kanagawa (JP); Yoshiaki Inoue, Aichi (JP)

(73) Assignee: Sony Corporation (JP)

( * ) Notice: Subject to any disclaimer, the term of this patent is extended or adjusted under 35 U.S.C. 154(b) by 876 days.

(21) Appl. No.: 13/143,274

(22) PCT Filed: Jan. 18, 2010

(86) PCT No.: PCT/JP2010/050475
§ 371 (c)(1), (2), (4) Date: Jul. 5, 2011

(87) PCT Pub. No.: WO2010/084835
PCT Pub. Date: Jul. 29, 2010

(65) Prior Publication Data
US 2011/0266875 A1   Nov. 3, 2011

(30) Foreign Application Priority Data

Jan. 23, 2009   (JP) .................................. 2009-013674

(51) Int. Cl.
*H02J 1/00* (2006.01)
*H01M 16/00* (2006.01)
(Continued)

(52) U.S. Cl.
CPC ........ *H01M 16/003* (2013.01); *H01M 8/04955* (2013.01); *H01M 10/441* (2013.01); *H01M 10/465* (2013.01); *H01M 16/00* (2013.01);
(Continued)

(58) Field of Classification Search
USPC .......................................................... 307/87
See application file for complete search history.

(56) References Cited

U.S. PATENT DOCUMENTS

| 5,444,358 A * | 8/1995 | Delepaut ........................ 323/222 |
| 6,124,700 A * | 9/2000 | Nagai et al. .................... 320/132 |
| 2002/0171399 A1* | 11/2002 | Kitagawa ........................ 320/134 |

FOREIGN PATENT DOCUMENTS

| JP | HEI 1-159553 | 11/1989 |
| JP | HEI 04-248329 | 9/1992 |

(Continued)

OTHER PUBLICATIONS

English translation of Kimura et al JP 11-59553 A; published Jun. 22, 1989.*
English translation of Nagai JP 04-248329 A; published Sep. 3, 1992.*

*Primary Examiner* — Jared Fureman
*Assistant Examiner* — Duc M Pham
(74) *Attorney, Agent, or Firm* — Sheridan Ross P.C.

(57) ABSTRACT

A power supply system capable of inhibiting electricity loss and deterioration of each power supply device while realizing high stability in the case where electricity supply is performed by using a plurality of power supply devices is provided. A switching element corresponding to a power supply device having a higher inter-terminal voltage out of two power supply devices selectively becomes in ON state, and a switching element corresponding to a power supply device having a lower inter-terminal voltage selectively becomes in OFF state. Thereby, overload on a specific power supply device is prevented, and current flow between the different power supply devices is able to be prevented without generating needless electricity loss. Further, since electricity of the power supply device having a higher inter-terminal voltage is selectively outputted, variation between the respective power supply devices becomes allowable to some extent.

16 Claims, 14 Drawing Sheets

(51) Int. Cl.
  *H01M 8/04* (2006.01)
  *H01M 10/44* (2006.01)
  *H01M 10/46* (2006.01)
  *H02J 1/10* (2006.01)
  *H01M 10/0525* (2010.01)
  *H01J 7/34* (2006.01)

(52) U.S. Cl.
  CPC .............. *H02J1/10* (2013.01); *H01M 8/04559* (2013.01); *H01M 8/0488* (2013.01); *H01M 10/0525* (2013.01); *H01M 2250/30* (2013.01); *H01J 7/34* (2013.01); *Y02B 90/18* (2013.01); *Y02E 60/50* (2013.01)

(56) References Cited

FOREIGN PATENT DOCUMENTS

| | | |
|---|---|---|
| JP | HEI 08-050902 | 2/1996 |
| JP | HEI 08-130837 | 5/1996 |
| JP | HEI 10-262341 | 9/1998 |
| JP | 2008-035589 | 2/2008 |
| JP | 2008-182809 | 8/2008 |
| JP | 2008-245481 | 10/2008 |
| JP | SHO 59-230435 | 7/2011 |

\* cited by examiner (A)

(B)

POWER SUPPLY SYSTEM AND ELECTRONIC DEVICE

CROSS REFERENCE TO RELATED APPLICATIONS

The present application is a National Stage of International Application No. PCT/JP2010/050475 filed on Jan. 18, 2010, which claims priority to Japanese Patent Application No. 2009-013674, filed in the Japanese Patent Office on Jan. 23, 2009, the entire contents of which are being incorporated herein by reference.

BACKGROUND

The present invention relates to a power supply system having a plurality of power supply devices and an electronic device including such a power supply system.

A power supply device such as a primary battery including a dry battery, a secondary battery such as a lithium ion battery, and a power generating device such as a fuel cell and a solar cell is used as an assembled battery in which a plurality of cells are connected in series or in parallel with each other to meet electricity demand of electronic devices.

However, in the case where characteristics and deterioration degree of each power supply device varies, a specific power supply device suffers overload. Accordingly, characteristics as an assembled battery are lowered. In some cases, a dangerous failure is caused thereby.

For example, in the case where an assembled battery is configured by connecting a plurality of cells in series, variation of the respective cells becomes an enormous problem. Specifically, in the case where each internal resistance of each cell varies, heat value is increased in the cell having high internal resistance, and deterioration in the cell rapidly proceeds particularly. If deterioration proceeds, the internal resistance is more increased. Finally, voltage drop due to internal resistance exceeds electromotive force, resulting in "polarity inversion state" in which inter-terminal voltage is reversed. Further, in such a polarity inversion state, output as an assembled battery is significantly lowered (For example, refer to Patent documents 1 and 2).

Meanwhile, in the case where an assembled battery is configured by connecting a plurality of cells in parallel, variation of the respective cells becomes an enormous problem as well. In the case where a plurality of each cells having different electromotive force are connected in parallel, a current is flown from the cell having high electromotive force to the cell having low electromotive force. Such backflow phenomenon more easily occurs as the internal resistance of the cell is lower in principle. Thus, as the cell performance is improved more and the internal resistance is decreased more, backflow current is more increased, which is so-called trade-off.

Here, in the case where an assembled battery is configured by connecting power supply devices such as a dry battery, a fuel cell, and a solar cell not available for charge (battery backflow) in series, variation of the respective cells becomes more enormous problem. For example, in the case of the dry battery, if a new dry battery and an old dry battery are connected in parallel, a current is flown from the new battery having high electromotive force to the old battery, and thus air bubbles and the like are generated in the old battery, possibly resulting in rupture. Further, in the case of the fuel cell and the solar cell, a current is forcefully flown from a cell having high electromotive force to a cell having low electromotive force, and thus deterioration of electrode materials may be promoted (for example, refer to Patent document 3).

Further, in the case where an assembled battery is configured by connecting active fuel cells in which a fuel is supplied by a pump or the like in parallel, the state thereof is more serious. In the active fuel cell, the fuel supply amount easily becomes pulsative. That is, time change of electromotive force is significantly large. Therefore, in order to obtain stable power generation of a plurality of fuel cells, it is desirable to independently control fuel spouting. However, due to such independent control, each electromotive force varies among the plurality of fuel cells.

Further, in the case where an assembled battery is configured by connecting solar cells in parallel, the state thereof is more serious similarly. This is because in the solar cell, if part thereof is shaded, its electromotive force is changed.

CITATION LIST

Patent Document

Patent document 1: Japanese Unexamined Patent Application Publication No. 2008-245481

Patent document 2: Japanese Unexamined Patent Application Publication No. 2008-182809

Patent document 3: Japanese Unexamined Patent Application Publication No. 59-230435

SUMMARY

Therefore, to solve the foregoing problems, a method using a rectifier (diode) may be a candidate method. Specifically, in the method, by connecting the diode in series with each battery that is connected in parallel with each other, current flow from other battery is prevented while high stability is obtained.

However, in this method, due to voltage drop of the diode, needless electricity loss is generated. Thus, if a Schottky barrier diode with a small forward voltage is used, such electricity loss is able to be decreased to some extent. However, in the power generating device having low electromotive force such as a fuel cell and a solar cell, even if the Schottky barrier diode is used, relative electricity loss becomes large, resulting in a problem.

In performing electricity supply by using a plurality of power supply devices as above, it is desirable to inhibit electricity loss and deterioration of each power supply device while high stability is realized.

In view of the foregoing problems, it is an object of the present invention to provide a power supply system capable of suppressing electricity loss and deterioration of each power supply device while realizing high stability in the case where electricity supply is performed by using a plurality of power supply devices, and an electronic device including such a power supply system.

A power supply system according to an embodiment of the present invention includes a plurality of power supply devices; switching elements that are respectively connected in series with the respective power supply devices; and a control circuit section controlling ON/OFF state of the respective switching elements so that a switching element corresponding to a power supply device having the highest inter-terminal voltage among the plurality of power supply devices selectively becomes in ON state, and a switching element corresponding to the other power supply devices becomes in OFF state, based on inter-terminal voltages of the respective power supply devices.

Here, "power supply device" means, for example, a primary battery, a secondary battery, or a power generating device (a fuel cell, a solar cell or the like). Otherwise, a combination of different types of power supply devices may be used.

An electronic device according to an embodiment of the present invention includes the foregoing power supply system.

In the power supply system and the electronic device according to the embodiment of the present invention, ON/OFF state of the respective switching elements is controlled so that the switching element corresponding to the power supply device having the highest inter-terminal voltage among the plurality of power supply devices selectively becomes in ON state, and the switching element corresponding to the other power supply devices becomes in OFF state. Thereby, overload on a specific power supply device due to variation of characteristics and variation of deterioration degree among the respective power supply devices is prevented. Further, since the switching element corresponding to the power supply device having the highest inter-terminal voltage selectively becomes in ON state, current flow between the different power supply devices is prevented without generating needless electricity loss different from an existing case using a diode. Further, since electricity of the power supply device having the highest inter-terminal voltage is selectively outputted, variation among the respective power supply devices becomes allowable to some extent, compared to a case that output is made by connecting a plurality of power supply devices in series with each other.

According to the power supply system and the electronic device according to the embodiment of the present invention, ON/OFF state of the respective switching elements is controlled so that the switching element corresponding to the power supply device having the highest inter-terminal voltage among the plurality of power supply devices selectively becomes in ON state, and the switching element corresponding to the other power supply devices becomes in OFF state. Thus, overload on a specific power supply device is prevented, and current flow among the different power supply devices is able to be prevented without generating needless electricity loss. Further, since electricity of the power supply device having the highest inter-terminal voltage is selectively outputted, variation among the respective power supply devices becomes allowable to some extent. Thus, in the case where electricity supply is performed by using a plurality of power supply devices, electricity loss and deterioration of each power supply device are able to be inhibited while high stability is realized.

Additional features and advantages of the present invention are described herein, and will be apparent from the following Detailed Description and the Figures.

BRIEF DESCRIPTION OF THE FIFURES

DETAILED DESCRIPTION

Embodiments of the present invention will be hereinafter described in detail with reference to the drawings. The description will be given in the following order:
1. First embodiment (basic structure example for connection switching in an electricity supply section)
2. Second embodiment (multistage structure example for connection switching in an electricity supply section)
3. Third embodiment (structure example for charge and discharge dual-use in the case of using a secondary battery)
4. Modification and application example (example of applying to a fuel cell system or the like)

<1. First Embodiment>
[Whole Configuration Example of Power Supply System]

Figure 1:
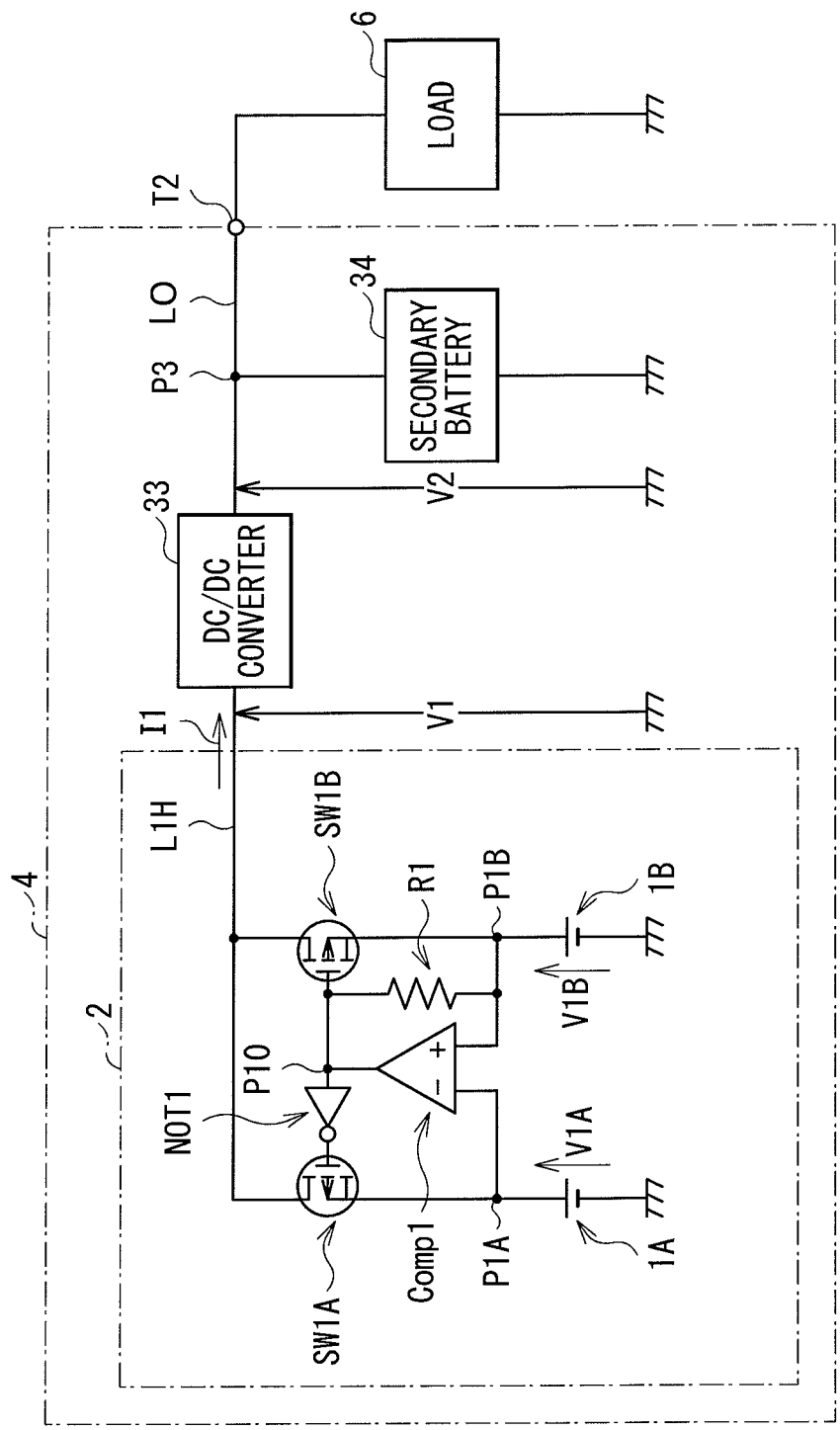
FIG. 1 is a diagram illustrating a whole configuration of a power supply system according to a first embodiment of the invention.

FIG. 1 illustrates a whole configuration of a power supply system (power supply system 4) according to an embodiment of the present invention. The power supply system 4 supplies electricity for driving a load 6 through an output terminal T2. The power supply system 4 is composed of an electricity supply section 2, a DC/DC converter 33, and a secondary battery 34.

The electricity supply section 2 generates inter-terminal voltage (electromotive force) V1 for supplying electricity. The electricity supply section 2 has two power supply devices 1A and 1B, two (a pair of) switching elements SW1A and SW1B, a comparator Comp1, a logical NOT circuit (inverter) NOT1, and a resistor R1.

The power supply device 1A generates an inter-terminal voltage V1A, and the power supply device 1B generates an inter-terminal voltage V1B. One end of the power supply device 1A is connected to a connection point P1A, and the other end thereof is grounded. One end of the power supply device 1B is connected to a connection point P1B, and the other end of thereof is grounded. As such power supply devices 1A and 1B, a primary battery, a secondary battery, a power generating device, or a combination thereof is able to be used. Specifically, examples of primary battery include a dry battery such as a manganese battery and an alkali battery, a mercury battery, a silver oxide battery, and a lithium battery. Examples of secondary battery include a lithium ion battery, a nickel cadmium battery, a nickel hydride battery, and a lead battery. Examples of power generating device include a fuel cell, a solar cell, and a DC dynamo.

The switching elements SW1A and SW1B are respectively connected in series with one end side (connection points P1A and P1B side) of the respective power supply devices 1A and 1B. The switching elements SW1A and SW1B are composed of, for example, a field effect transistor (FET), a bipolar transistor, an IGBT (insulated gate bipolar transistor), a relay or the like. In the case where the switching elements SW1A and SW1B are composed of the FET, high speed switching operation is enabled. Meanwhile, in the case where the switching elements SW1A and SW1B are composed of a relay, resistance in ON state (ON resistance) is able to be kept low. The switching elements SW1A and SW1B are respectively composed of a p-channel MOS-FET. A gate of the switching element SW1A is connected to an output terminal of the logical NOT circuit NOT1, a drain thereof is connected to a connection line L1H, and a source thereof is connected to a connection point P1A. A gate of the switching element SW1B is connected to a connection point P10, a drain thereof is connected to the connection line L1H, and a source thereof is connected to the connection point P1B.

The comparator Comp1 outputs output voltage "High (Vcc)" or "Low (GND)" according to potential difference between the connection points P1A and P1B (potential difference between the inter-terminal voltages V1A and V1B). An inverting input terminal of the comparator Comp1 is connected to the connection point NA, a non-inverting input terminal thereof is connected to the connection point P1B, and an output terminal thereof is connected to the connection point P10.

The logical NOT circuit NOT1 outputs a voltage to become a logical NOT signal of an output voltage from the comparator Comp1. An input terminal thereof is connected to the connection point P10, and an output terminal is connected to the gate of the switching element SW1A.

The resistor R1 is a resistor for giving hysteresis to the comparator Comp1. One end thereof is connected to the connection point P1B, and the other end thereof is connected to the connection point P10.

With the foregoing structure, a control circuit section (discharge circuit section) controlling ON/OFF state of the respective switching elements SW1A and SW1B is composed of the switching elements SW1A and SW1B, the comparator Comp1, the logical NOT circuit NOT1, and the resistor R1. Specifically, the control circuit section exercises control so that the switching element corresponding to the one having the highest inter-terminal voltage (higher electromotive force) out of the power supply devices 1A and 1B selectively becomes in ON state based on the inter-terminal voltages V1A and V1B of the respective power supply devices 1A and 1B. Further, all switching elements corresponding to the other power supply devices (having a lower inter-terminal voltage) become in OFF state. That is, such a control circuit section (discharge circuit section) operates as an interlock switch.

The DC/DC converter 33 is arranged between the connection line L1H and a connection point P3 on an output line LO. The DC/DC converter 33 performs voltage conversion (for example, performs voltage rise) for an inter-terminal voltage V1 (DC voltage) of the electricity supply section 2, and thereby generates a DC voltage V2.

The secondary battery 34 is arranged between the connection point P3 on the output line LO and earth ground. The secondary battery 34 performs electric storage based on the DC voltage V2 generated by the DC/DC converter 33. The secondary battery 34 is composed of, for example, a lithium ion battery or the like.

[Operation and Effect of the Power Supply System]

Next, a description will be given in detail of operation and effect of the power supply system 4 of this embodiment.

(Basic Operation Example of the Power Supply System)

In the power supply system 4, a current (power generation current) I1 is extracted from the electricity supply section 2 based on the inter-terminal voltages V1A and V1B in the power supply devices 1A and 1B. The inter-terminal voltage (DC voltage) V1 based on the current I1 is provided with voltage conversion by the DC/DC converter 33 to become the DC voltage V2. The DC voltage V2 is supplied to the secondary battery 34 or a load (for example, an electronic device body). In the case where the DC voltage V2 is supplied to the secondary battery 34, the secondary battery 34 is charged based on the voltage. Meanwhile, in the case where the DC voltage V2 is supplied to the load 6 through an output terminal T2, the load 6 is driven, and predetermined operation is made.

At this time, in the electricity supply section 2, connection switching operation is performed between the plurality of power supply devices 1A and 1B, and thereby the current I1 and the inter-terminal voltage V1 are extracted as the entire electricity supply section 2.

(Connection Switching Operation in Comparative Examples)

Figure 2:
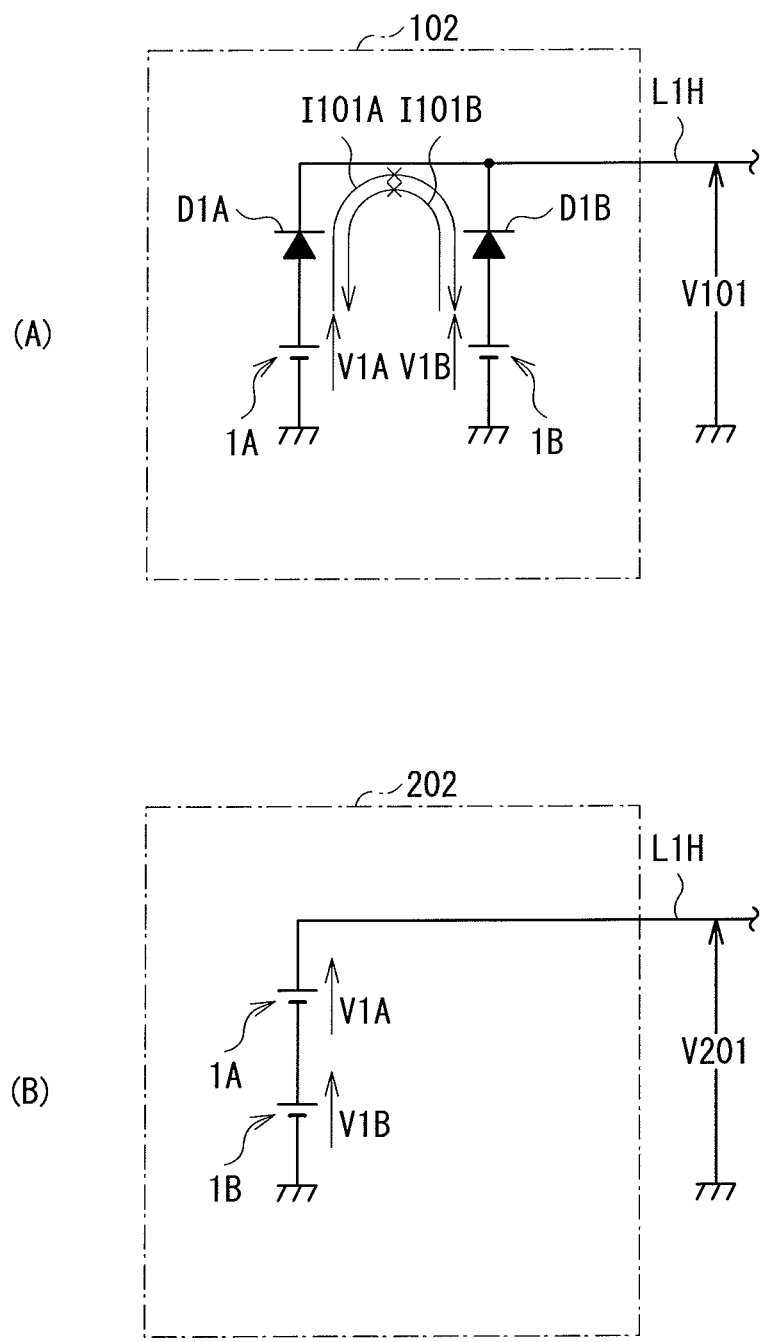
FIG. 2 are circuit diagrams illustrating a configuration and operation of an electricity supply section according to a comparative example.

Here, before describing the connection switching operation of this embodiment, first, a description will be given of connection switching operation in electricity supply sections according to comparative examples with reference to FIG. 2. FIG. 2 illustrates structures of the electricity supply sections according to the comparative examples. FIG. 2(A) illustrates an electricity supply section 102 according to Comparative example 1, and FIG. 2(B) illustrates an electricity supply section 202 according to Comparative example 2, respectively.

In Comparative example 1 illustrated in FIG. 2(A), the two power supply devices 1A and 1B are connected in parallel with each other, and diodes D1A and D1B are connected in series with the power supply devices 1A and 1B. Thus, even if variation exists between the respective power supply devices 1A and 1B, in the case where an output voltage V101 is outputted, current flow is prevented (refer to current paths I101A and I101B in the figure).

However, in Comparative example 1, due to voltage drop of the diode, needless electricity loss is generated. Thus, if a Schottky barrier diode with a small forward voltage is used, such electricity loss is able to be decreased to some extent. However, in the case where a power generating device having low electromotive force such as a fuel cell and a solar cell is used as the power supply devices 1A and 1B, even if the Schottky barrier diode is used, relative electricity loss becomes large, resulting in a trouble.

Meanwhile, in Comparative example 2 illustrated in FIG. 2(B), the two power supply devices 1A and 1B are connected in series with each other. Thus, the foregoing diodes D1A and D1B (backflow prevention device) are not needed, and thus needless electricity loss is not generated.

However, in Comparative example 2, variation between the respective power supply devices 1A and 1B becomes an enormous problem. Specifically, in the case where each internal resistance (not illustrated) of the power supply devices 1A and 1B varies, heat value is increased in the power supply device having higher internal resistance, and deterioration in such a power supply device rapidly proceeds particularly. If deterioration proceeds, the internal resistance is more increased. Finally, voltage drop caused by internal resistance exceeds electromotive force, resulting in "polarity inversion state" in which inter-terminal voltage is reversed. Further, in such a polarity inversion state, output as an entire electricity supply section 202 (output voltage V201) is largely lowered.

Figure 3:
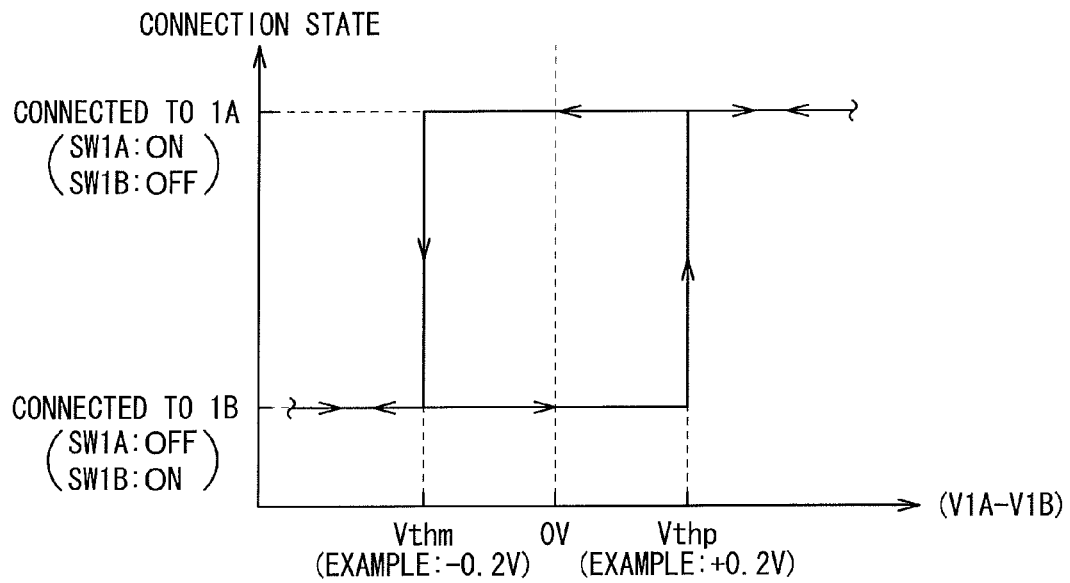
FIG. 3 is a schematic diagram for explaining an example of connection switching operation of the power supply device in the electricity supply section illustrated in FIG. 1.
Figure 4:
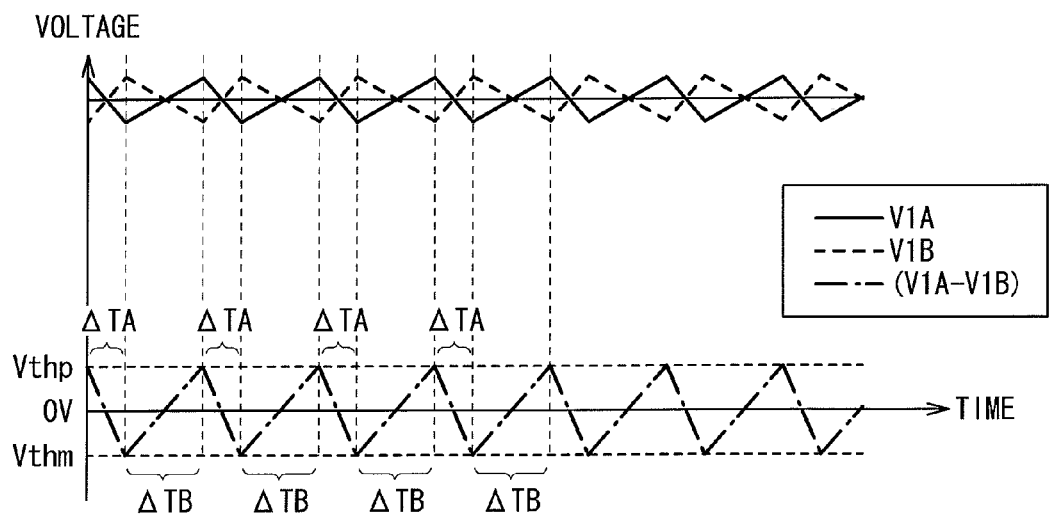
FIG. 4 is a timing waveform chart for explaining an example of connection switching operation of the power supply device in the electricity supply section illustrated in FIG. 1.
Figure 5:
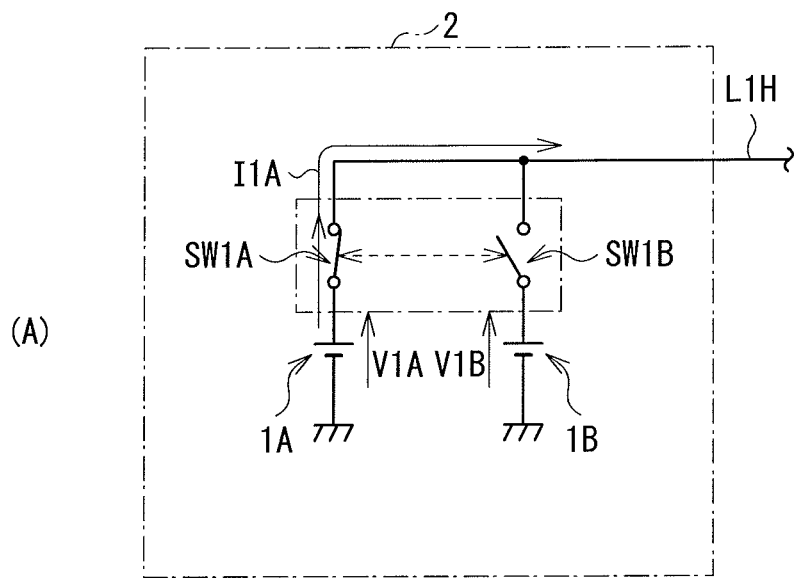
FIG. 5 are schematic views illustrating an example of connection state of the power supply device in the electricity supply section illustrated in FIG. 1.
Figure 5:
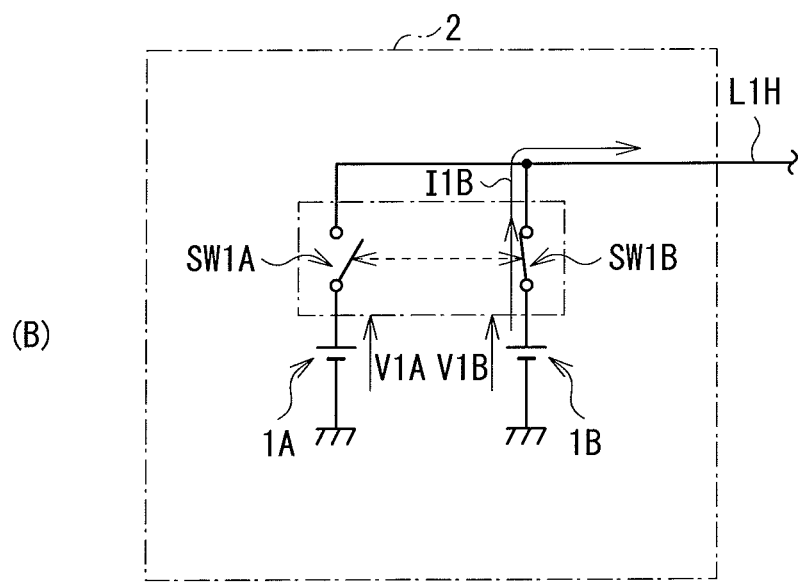

Meanwhile, in the electricity supply section 2 of this embodiment, the switching elements SW1A and SW1B are connected in series with the respective power supply devices 1A and 1B as illustrated in FIG. 3 to FIG. 5. Further, paying attention to characteristics of power supply devices that as a current is drawn out more, a voltage is more decreased, the switching element corresponding to the power supply device having a higher inter-terminal voltage selectively becomes in ON state. Specifically, in the foregoing control circuit section, connection switching of ON/OFF state of the respective switching elements SW1A and SW1B is performed according to difference between the inter-terminal voltages (V1A-V1B) of the two power supply devices 1A and 1B.

Further, in this embodiment, as illustrated in FIG. 3 and FIG. 4, the threshold voltages in the difference between the inter-terminal voltages (V1A-V1B) in such connection switching at the time when the difference between the inter-terminal voltages (V1A-V1B) is increased and at the time when the difference between the inter-terminal voltages (V1A-V1B) is decreased are Vthp and Vthm which are different values from each other. Specifically, in the case where the difference between the inter-terminal voltages (V1A-V1B) is increased, connection state is switched at the threshold voltage Vthp (>thm, for example, 0.2 V). Meanwhile, in the case where the difference between the inter-terminal voltages (V1A-V1B) is decreased, connection state is switched at the threshold voltage Vthm (<Vthp, for example, −0.2 V).

Thus, first, in operation time period ΔTA indicated in FIG. 4, for example, as illustrated in FIG. 5(A), the switching element SW1A corresponding to the power supply device 1A having a higher inter-terminal voltage selectively becomes in ON state, and the other switching element SW1B becomes in OFF state. Thereby, a current is able to be drawn out from outside to the power supply device 1A by a discharge current I1A in the figure, and the inter-terminal voltage V1A is lowered according to the load 6.

Then, in the case where the inter-terminal voltage V1A is lower than the threshold voltage Vthm, for example, as illustrated in FIG. 5(B), the switching element SW1A becomes in OFF state, and the switching element SW1B becomes in ON state in association therewith (operation time period ΔTB in FIG. 4). Thus, in the operation time period ΔTB, in this case, a current is drawn out from outside to the power supply device 1B by a discharge current I1B in the figure.

Then, after that, the inter-terminal voltage V1B of the power supply device 1B is decreased, while the inter-terminal voltage 1A of the power supply device 1A is restored. Thus, the switching element SW1B on the power supply device 1B side becomes in OFF state, and the switching element SW1A on the power supply device 1A side becomes in ON state (the operation time period ΔTA in FIG. 4). Accordingly, the operation time periods ΔTA and ΔTB are repeated.

Accordingly, the switching element corresponding to the power supply device having a higher inter-terminal voltage out of the two power supply devices 1A and 1B becomes selectively in ON state, and the switching element corresponding to the power supply device having a lower inter-terminal voltage becomes in OFF state. Thereby, overload on a specific power supply device due to variation of characteristics and deterioration variation between the respective power supply devices 1A and 1B is prevented.

Further, the switching element corresponding to the power supply device having a higher inter-terminal voltage becomes selectively in ON state. Thus, differently from a case using the existing diode, needless electricity loss is not generated and current flow between the different power supply devices 1A and 1B is prevented. That is, in this embodiment, while the power supply devices 1A and 1B are rapidly switched, a current is drawn out from both thereof on average. If the power supply device 1A is deteriorated more than the power supply device 1B, and the power supply device 1A has higher internal resistance, inter-terminal voltage lowering speed of the power supply device 1A is higher than that of power supply device 1B. In this embodiment, time that the power supply device 1A with rapid voltage lowering is linked with the load becomes short, and usage while protecting the deteriorated power supply device 1A is enabled. Further, since about several ten mΩ ON resistance of the switching elements SW1A and SW1B is able to be selected, electricity loss is kept to the minimum.

Further, electricity (power generation electricity) of the power supply device having a higher inter-terminal voltage is selectively outputted. Thus, compared to a case that output is made by connecting the two power supply devices 1A and 1B in series with each other, variation between the respective power supply devices 1A and 1B becomes allowable to some extent.

Figure 6:
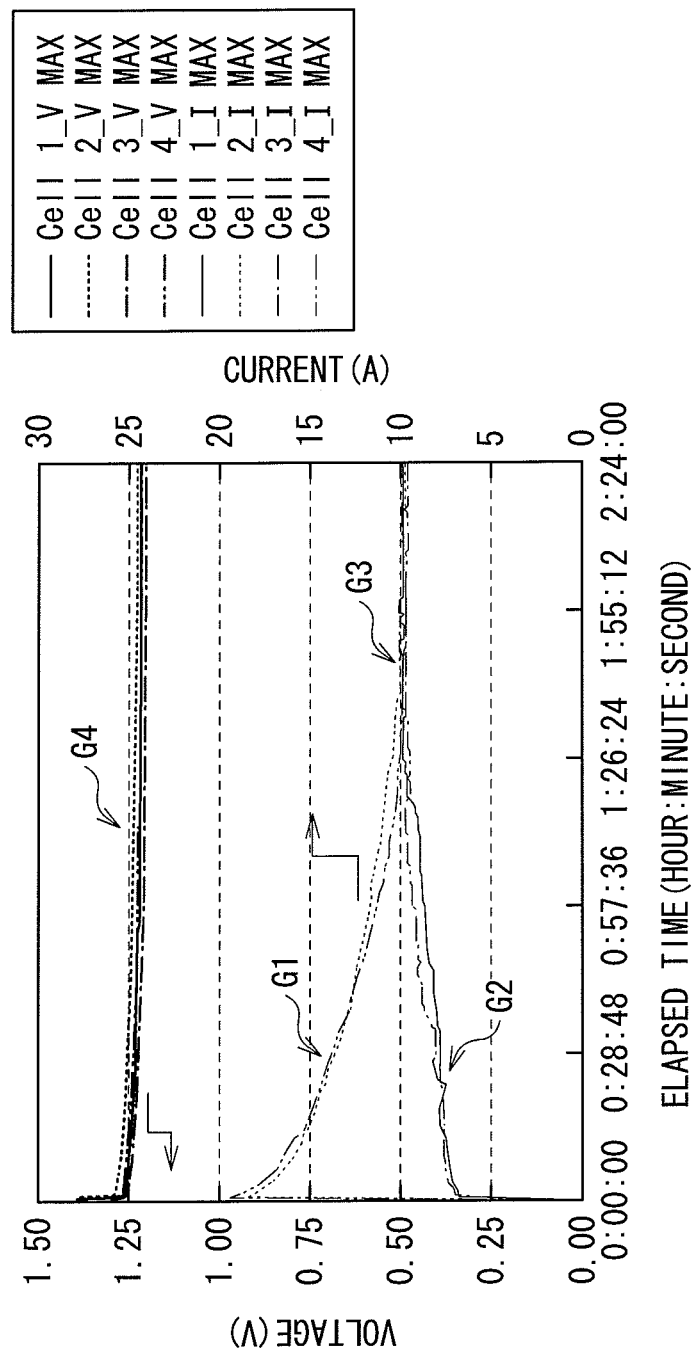
FIG. 6 is a characteristics diagram illustrating an example of aging characteristics of a voltage and a current in a plurality of power supply devices.

Here, FIG. 6 illustrates a result of discharge test in the circuit configuration of the electricity supply section 2 of this embodiment by using four nickel hydride batteries (a cell 1 to a cell 4). Here, the cell 2 and the cell 4 correspond to a cell in a state close to full charged state, and the cell 1 and the cell 3 correspond to a cell in a state being discharged. In addition, referential symbol G4 in the figure indicates a voltage value (V) in the cell 1 to the cell 4. Further, referential symbol G1 in the figure indicates a current value (A) in the cell 2 and the cell 4, referential symbol G2 indicates a current value (A) in the cell 1 and the cell 3, and referential symbol G3 indicates a current value (A) in the cells 1 to 4, respectively. As indicated by the referential symbols G1 to G4, in the early stage of discharge, a current was preferentially drawn out from the cell 2 and the cell 4, while after two hours, a current was drawn from the all cells almost evenly. Thus, it was found that by using the circuit of this embodiment, even if batteries with each charge state different from each other were concurrently used, discharge was able to be performed safely and efficiently.

As described above, in this embodiment, ON/OFF state of the respective switching elements SW1A and SW1B is controlled so that the switching element corresponding to the power supply device having a higher inter-terminal voltage out of the two power supply devices 1A and 1B becomes selectively in ON state, and the switching element corresponding to the power supply device having a lower inter-terminal voltage becomes in OFF state. Thus, overload on a specific power supply device is prevented, and current flow between the different power supply devices 1A and 1B is able to be prevented without generating needless electricity loss. Further, since electricity of the power supply device having a higher inter-terminal voltage is selectively outputted, variation between the respective power supply devices 1A and 1B becomes allowable to some extent. Therefore, in the case where electricity supply is performed by using a plurality of power supply devices, electricity loss and deterioration of each power supply device are able to be inhibited while high stability is realized.

Further, the threshold voltages in the difference between the inter-terminal voltages (V1A-V1B) in connection switching at the time when the difference between the inter-terminal voltages (V1A-V1B) is increased and at the time when the difference between the inter-terminal voltages (V1A-V1B) is decreased are Vthp and Vthm which are different values from each other (hysteresis is shown). Thus, in the case where values of the difference between the inter-terminal voltages fluctuates in the vicinity of the threshold voltage (flip-flop), connection state is avoided from being switched frequently, and electric power consumption in the comparator Comp1 or the like is suppressed.

Figure 7:
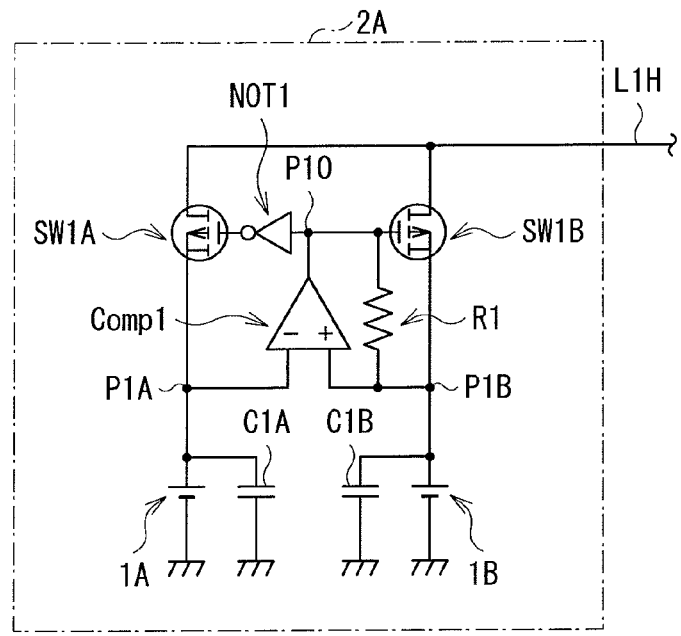
FIG. 7 is a circuit diagram illustrating a configuration of an electricity supply section according to a modification of the first embodiment.

In addition, in this embodiment, for example, as an electricity supply section 2A illustrated in FIG. 7, it is preferable that the condensers C1A and C1B (capacitative elements) are connected in parallel with the respective power supply devices 1A and 1B. In the case where such a structure is adopted, even if a corresponding switching element is in OFF state, an inter-terminal voltage is able to be stored in the condensers C1A and C1B. Thus, the respective power supply devices 1A and 1B are able to be stably and continuously discharged.

<2. Second Embodiment>

Next, a second embodiment of the present invention will be described. The description will be given by using the same referential symbols for the same elements as those of the first embodiment, and the description thereof will be omitted as appropriate.

[Structure Example of Electricity Supply Section]

Figure 8:
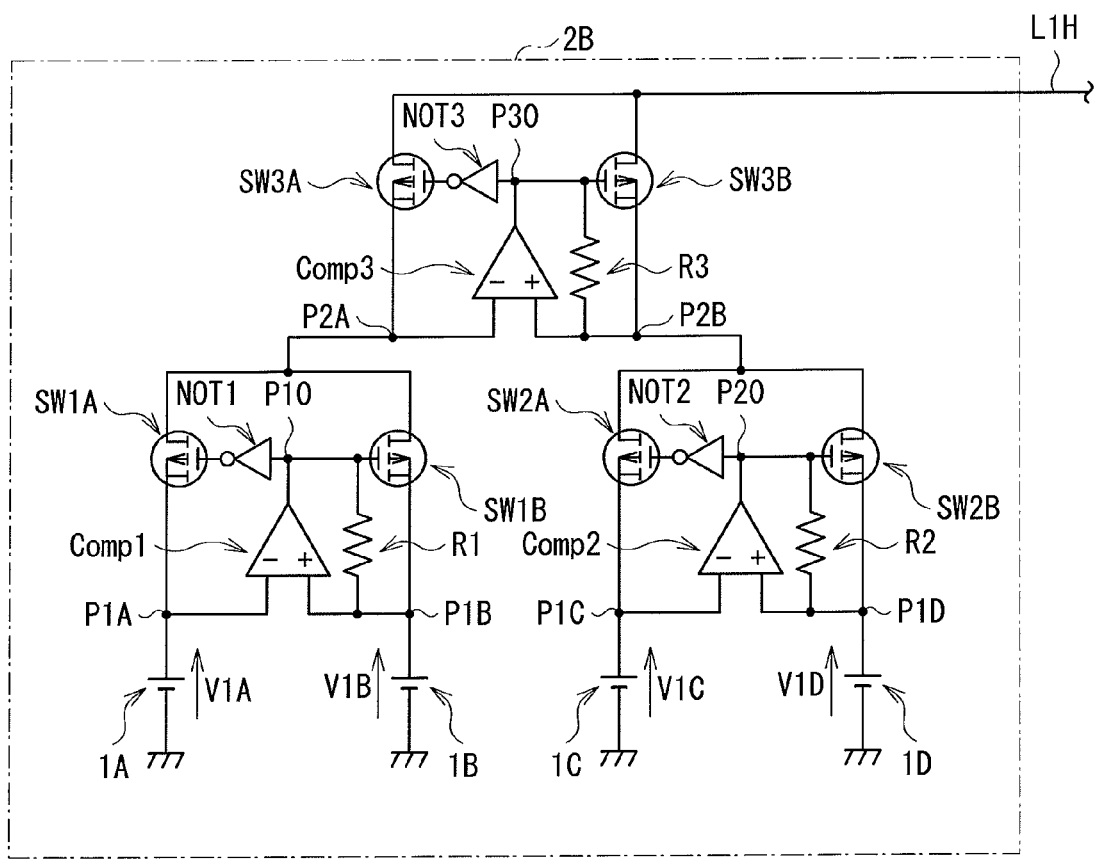
FIG. 8 is a circuit diagram illustrating a structure of an electricity supply section according to a second embodiment.

FIG. 8 illustrates a circuit configuration of an electricity supply section (electricity supply section 2B) of this embodiment. The electricity supply section 2B is obtained by providing a plurality of selective circuit sections that are configured to include a switching element and the foregoing control circuit section in the electricity supply section 2 of the first embodiment. In addition, the selective circuit sections have a multistage structure so that out of inter-terminal voltages that are respectively and selectively outputted by the plurality of selective circuit sections, the highest inter-terminal voltage is selectively outputted.

That is, the electricity supply section 2B has four power supply devices 1A to 1D and six (three pairs of) switching elements SW1A, SW1B, SW2A, SW2B, SW3A, and SW3B. Further, the electricity supply section 2B has three comparators Comp1 to Comp3, three logical NOT circuits NOT1 to NOT3, and three resistors R1 to R3. First stage structures of the power supply devices 1A and 1B are similar to the structure of the electricity supply section 2 of the first embodiment, except that the source of the switching elements SW1A and SW1B is connected to a connection point P2A instead of the connection line L1H, and thus a description thereof will be omitted.

First stage structures of the power supply devices 1C and 1D are fundamentally similar to the first stage structures of the power supply devices 1A and 1B. That is, one end of the power supply device 1C supplying an inter-terminal voltage V1C is connected to a connection point P1C, and the other end thereof is grounded. One end of the power supply device 1D supplying an inter-terminal voltage V1D is connected to a connection point P1D, and the other end thereof is grounded. The switching elements SW2A and SW2B are respectively composed of, for example, an MOS-FET, a bipolar transistor, an IGBT, a relay or the like. In this case, the switching elements SW2A and SW2B are respectively composed of, for example, a p-channel MOS-FET. A gate of the switching element SW2A is connected to an output terminal of the logical NOT circuit NOT2, a drain thereof is connected to a connection point P2B, and a source thereof is connected to the connection point P1C. A gate of the switching element SW2B is connected to a connection point P20, a drain thereof is connected to the connection point P2B, and a source thereof is connected to a connection point P1D. An inverting input terminal of the comparator Comp2 is connected to the connection point P1C, a non-inverting input terminal thereof is connected to the connection point P1D, and an output terminal thereof is connected to a connection point P20. An input terminal of the logical NOT circuit NOT2 is connected to the connection point P20, and an output terminal thereof is connected to the gate of the switching element SW2A. One end of the resistor R2 is connected to the connection point P1D, and the other end thereof is connected to the connection point P20.

Further, the second stage structure is fundamentally similar to the first stage structure. That is, the switching elements SW3A and SW3B are composed of, for example, an MOS-FET, a bipolar transistor, an IGBT, a relay or the like. In this case, the switching elements SW3A and SW3B are respectively composed of, for example, a p-channel MOS-FET. A gate of the switching element SW3A is connected to an output terminal of the logical NOT circuit NOT3, a drain thereof is connected to the connection line L1H, and a source thereof is connected to the connection point P2A. A gate of the switching element SW3B is connected to the connection point P20, a drain thereof is connected to the connection line L1H, and a source thereof is connected to the connection point P2B. An inverting input terminal of the comparator Comp3 is connected to the connection point P2A, a non-inverting input terminal thereof is connected to the connection point P2B, and an output terminal thereof is connected to a connection point P30. An input terminal of the logical NOT circuit NOT3 is connected to the connection point P30, and an output terminal thereof is connected to the gate of the switching element SW3A. One end of the resistor R3 is connected to the connection point P2B, and the other end thereof is connected to the connection point P30.

[Operation and Effect of the Electricity Supply Section]

With such a structure, in the electricity supply section 2B of this embodiment, in the respective selective circuit sections that are configured to include the switching element and the foregoing control circuit section, effect similar to that of the first embodiment is obtained by operation similar to that of the first embodiment.

Figure 9:
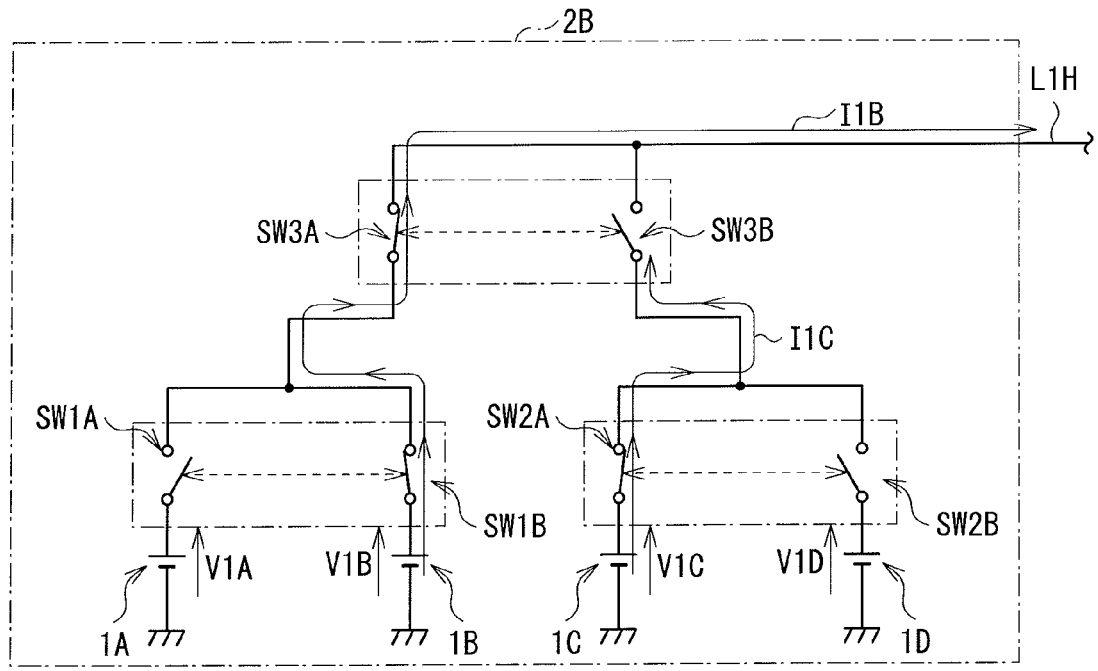
FIG. 9 is a schematic diagram for explaining an example of connection switching operation of the power supply device in the electricity supply section illustrated in FIG. 8.

Thus, in the electricity supply section 2B, for example, as illustrated in FIG. 9, in the case where the inter-terminal voltage V1B is highest out of the inter-terminal voltages V1A to V1D, the discharge current I1B in the figure is flown. That is, as in the tournament diagram, the "only one" power supply device having the highest inter-terminal voltage (in this case, the power supply device 1B) is connected to outside.

As described above, in this embodiment, the selective circuit sections have a multistage structure so that out of inter-terminal voltages that are respectively and selectively outputted by the plurality of selective circuit sections, the highest inter-terminal voltage is selectively outputted. Thus, even if three or more power supply devices are included, the power supply device having the highest inter-terminal voltage is able to be connected to outside.

Figure 10:
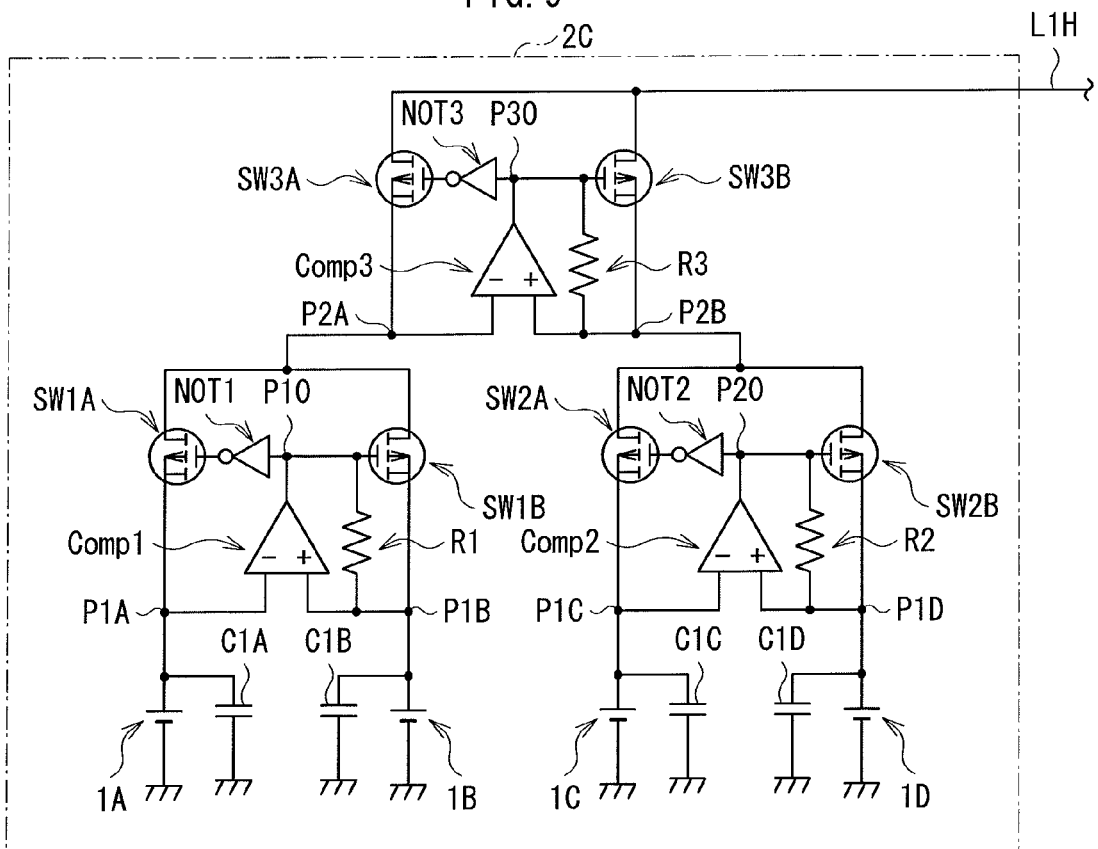
FIG. 10 is a circuit diagram illustrating a structure of an electricity supply section according to a modification of the second embodiment.

In addition, in this embodiment, again, for example, as the electricity supply section 2C illustrated in FIG. 10, the condensers C1A to C1D are preferably connected in parallel with the respective power supply devices 1A to 1D.

Further, in this embodiment, though the description has been given of the two stage structure, three or more stage structure may be adopted.

<3. Third Embodiment>

Next, a third embodiment of the present invention will be described. The description will be given by using the same referential symbols for the same elements as those of the first embodiment or the second embodiment, and the description thereof will be omitted as appropriate.

[Structure Example of Electricity Supply Section]

Figure 11:
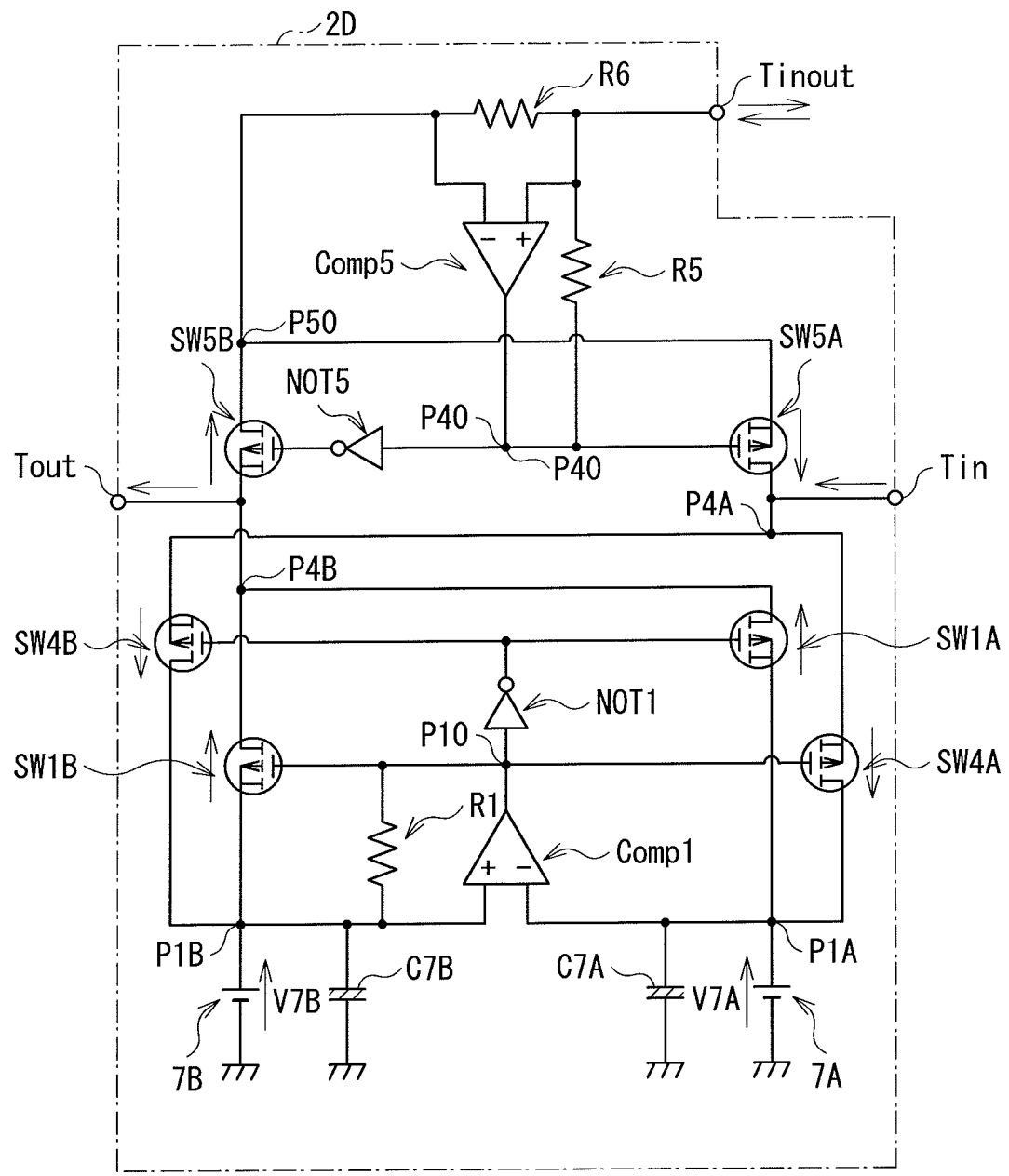
FIG. 11 is a circuit diagram illustrating a structure of an electricity supply section according to a third embodiment.

FIG. 11 illustrates a circuit configuration of an electricity supply section (electricity supply section 2D) of this embodiment. In the electricity supply section 2D, a power supply device is composed of a secondary battery (secondary batteries 7A and 7B) such as a lithium ion battery. Further, the foregoing control circuit section has a charge circuit section in addition to the discharge circuit section described in the first embodiment and the second embodiment. The discharge circuit section is a circuit that makes only the switching element corresponding to the secondary battery having a higher inter-terminal voltage out of the two secondary batteries 7A and 7B be ON state based on inter-terminal voltages V7A and V7B of the respective secondary batteries 7A and 7B, and selectively output the inter-terminal voltage of the secondary battery, and makes discharge. Meanwhile, the charge circuit section is a circuit that makes only the switching element corresponding to the secondary battery having a lower inter-terminal voltage out of the two secondary batteries 7A and 7B be ON state based on the inter-terminal voltages V7A and V7B, and selectively input a charge voltage from outside to the secondary battery to charge.

Specifically, the electricity supply section 2D has the two secondary batteries 7A and 7B, a charge exclusive terminal Tin, a discharge exclusive terminal Tout, and a charge/discharge dual purpose terminal Tinout.

The secondary batteries 7A and 7B respectively supply the inter-terminal voltages V7A and V7B. One end of the secondary battery 7A is connected to the connection point P1A, and the other end thereof is grounded. One end of the secondary battery 7B is connected to the connection point P1B, and the other end thereof is grounded. Examples of the secondary batteries 7A and 7B include a lithium ion battery, a nickel cadmium battery, a nickel hydride battery, and a lead battery. In addition, as the condensers 1A and 1B and the like described in the first embodiment and the second embodiment, condensers C7A and C7B are respectively connected in parallel with the secondary batteries 7A and 7B. Thereby, even if a corresponding switching element is in OFF state, an inter-terminal voltage is able to be stored in the condensers C7A and C7B. Thus, stable charge and discharge are enabled. Further, impedance at the time of charge is able to be decreased. However, such condensers C7A and C7B are not necessarily provided.

The electricity supply section 2D further has the two (a pair of) switching elements SW1A and SW1B, the comparator Comp1, the logical NOT circuit NOT1, and the resistor R1 that configure a circuit for performing connection switching operation at the time of discharge. The circuit configuration thereof is similar to the circuit configuration of the electricity supply section 2 of the first embodiment, except that the drain of the switching elements SW1A and SW1B is connected to the discharge exclusive terminal Tout instead of the connection line L1H. Thus, a description thereof will be omitted.

The electricity supply section 2D further has two (a pair of) switching elements SW4A and SW4B that configure a circuit for performing connection switching operation at the time of charge. The foregoing comparator Comp1, the logical NOT circuit NOT1, and the resistor R1 further configure a circuit for performing connection switching operation at the time of charge in addition to at the time of discharge.

The switching elements SW4A and SW4B are respectively composed of, for example, an MOS-FET, a bipolar transistor, an IGBT, a relay or the like. In this case, the switching elements SW4A and SW4B are respectively composed of, for example, a p-channel MOS-FET. A gate of the switching element SW4A is connected to the connection point P10, a source thereof is connected to the charge exclusive terminal Tin, and a drain thereof is connected to the connection point P1A. A gate of the switching element SW4B is connected to an output terminal of the logical NOT circuit NOT1, and a source thereof is connected to the charge exclusive terminal Tin, and a drain thereof is connected to the connection point P1B.

The electricity supply section 2D further has two (a pair of) switching elements SW5A and SW5B, a comparator Comp5, a logical NOT circuit NOT5, and resistors R5 and R6 that configure a circuit for performing terminal switch at the time of charge and at the time of discharge in the charge/discharge dual purpose terminal Tinout.

The switching elements SW5A and SW5B are respectively composed of, for example, an MOS-FET, a bipolar transistor, an IGBT, a relay or the like. In this case, the switching elements SW5A and SW5B are respectively composed of a p-channel MOS-FET. A gate of the switching element SW5A is connected to a connection point P40, a source thereof is connected to a connection point P50, and a drain thereof is connected to a connection point P4A. A gate of the switching element SW5B is connected to an output terminal of the logical NOT circuit NOT5, a drain thereof is connected to a connection point P50, and a source thereof is connected to a connection point P4B. An inverting input terminal of the comparator Comp5 is connected to the connection point P50 and one end of the resistor R6, a non-inverting input terminal thereof is connected to the other end of the resistor R6 and the charge/discharge dual purpose terminal Tinout, and an output terminal thereof is connected to a connection point P40. An input terminal of the logical NOT circuit 5 is connected to the connection point P40, and an output terminal thereof is connected to the gate of the switching element SW5B. One end of the resistor R5 is connected to the charge/discharge dual purpose terminal Tinout, and the other end thereof is connected to the connection point P40.

[Operation and Effect of the Electricity Supply Section]

According to the foregoing structure, in the electricity supply section 2D of this embodiment, only the secondary battery 7A having a higher inter-terminal voltage is linked at the time of discharge, and only the secondary battery 7B having a lower inter-terminal voltage is linked at the time of charge.

(Connection Switching Operation at the Time of Discharge)

Figure 12:
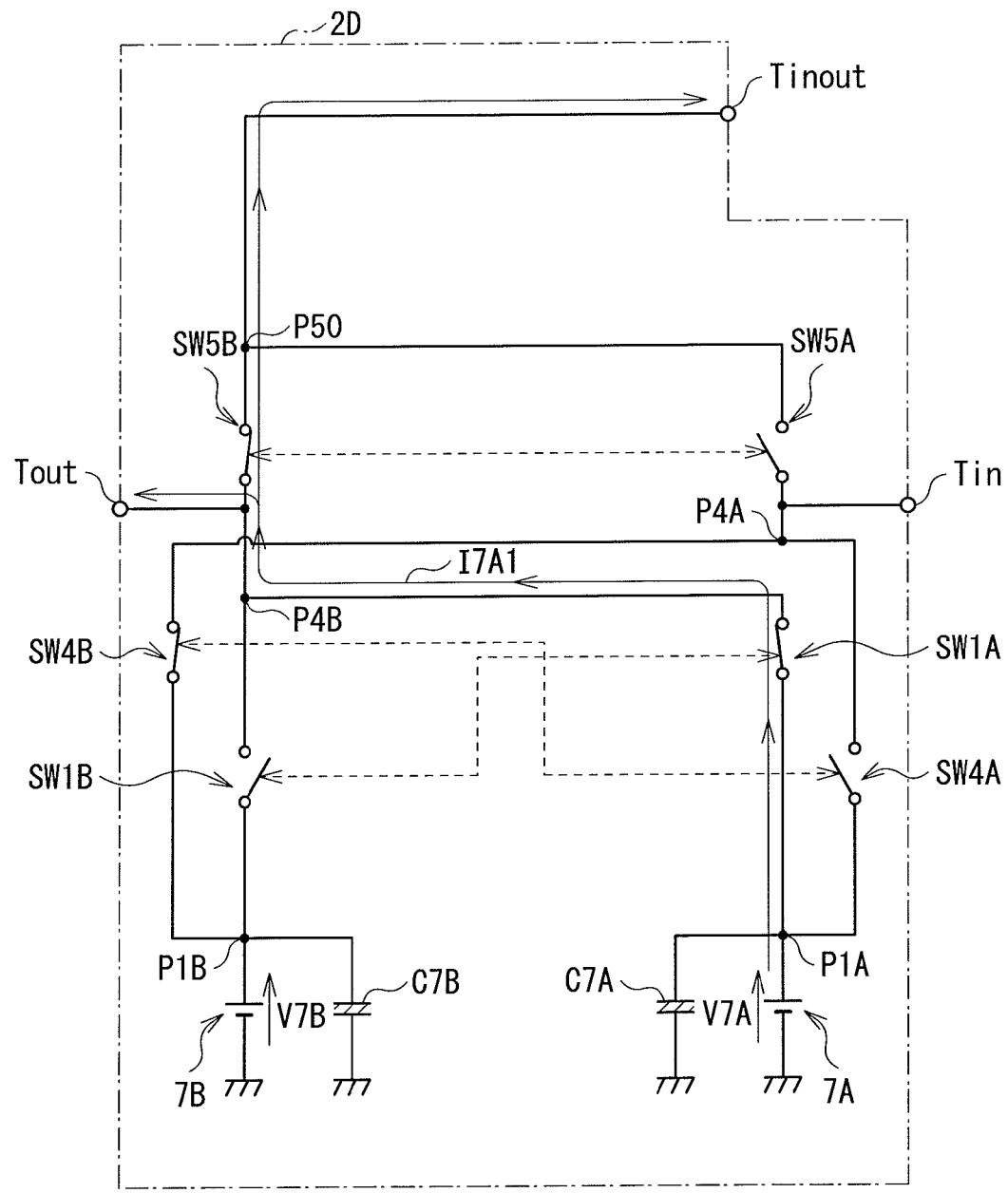
FIG. 12 is a schematic diagram for explaining an example of connection switching operation of the power supply device at the time of discharge in the electricity supply section illustrated in FIG. 11.
Figure 13:
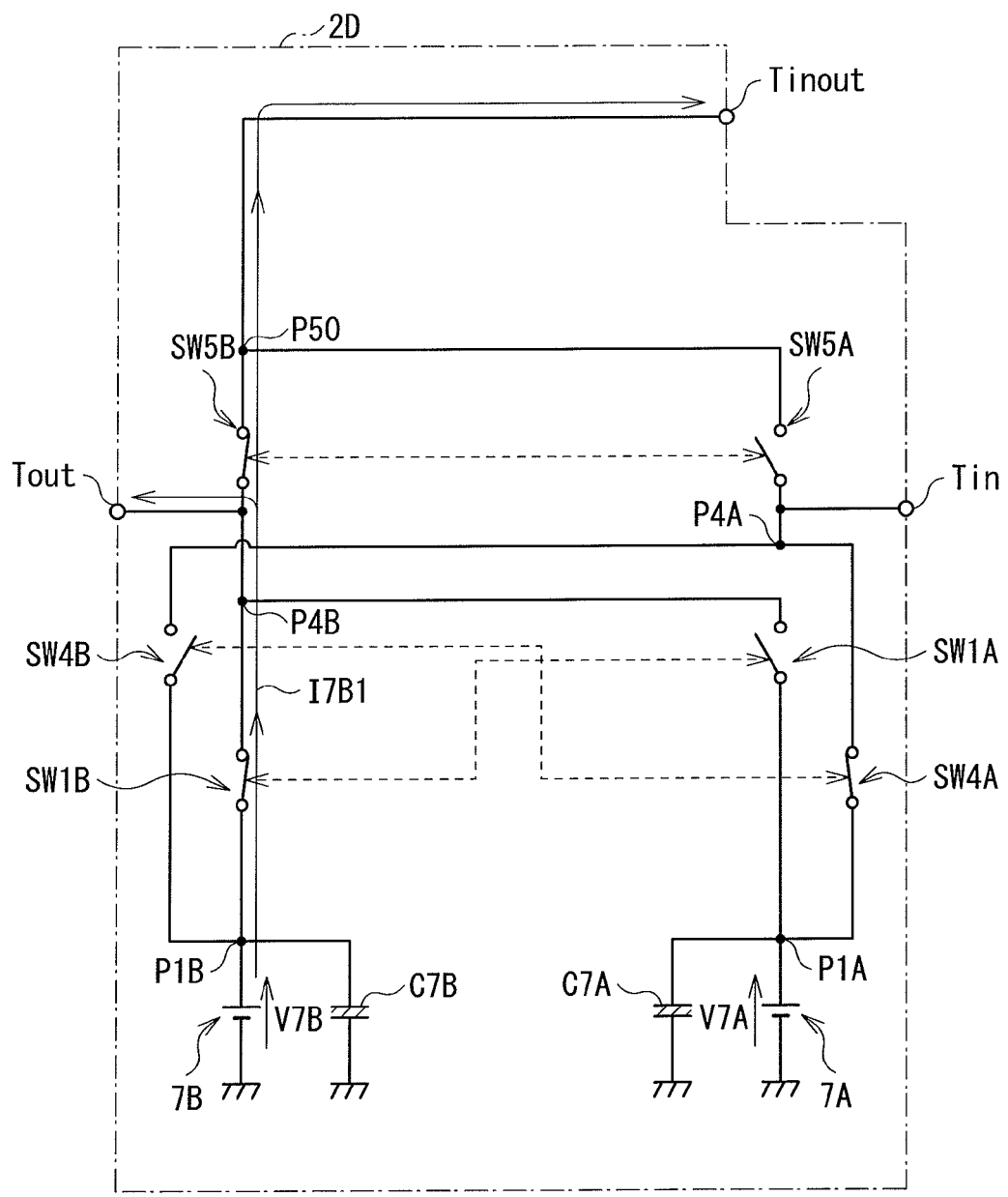
FIG. 13 is a schematic diagram for explaining another example of connection switching operation of the power supply device at the time of discharge in the electricity supply section illustrated in FIG. 11.

Specifically, in discharging, a discharge current 17A1 is flown, for example, as illustrated in FIG. 12 during time period of V7A>V7B, while a discharge current 17B1 is flown, for example, as illustrated in FIG. 13 during time period of V7A<V7B.

(Connection Switching Operation at the Time of Charge)

Figure 14:
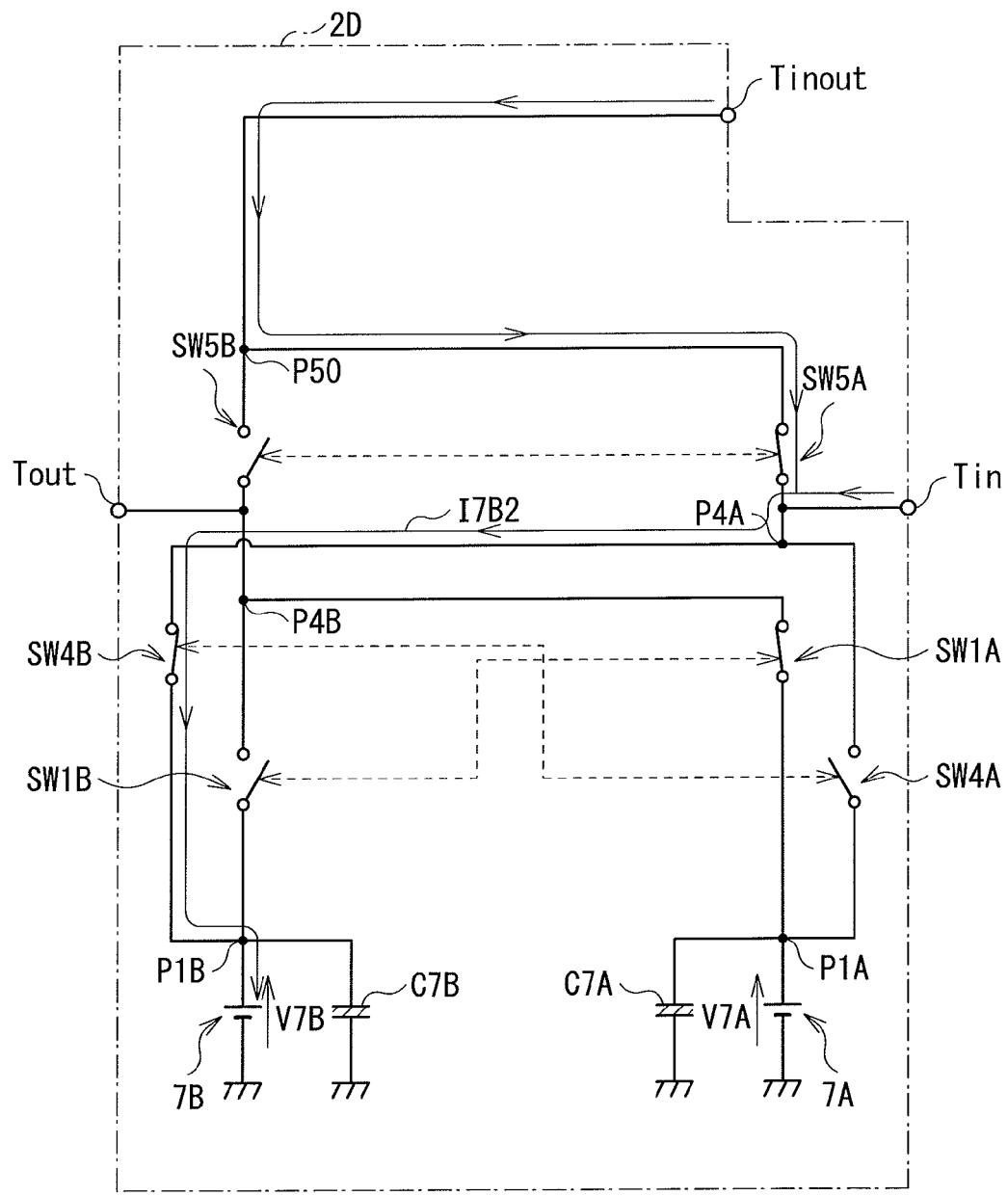
FIG. 14 is a schematic diagram for explaining an example of connection switching operation of the power supply device at the time of charge in the electricity supply section illustrated in FIG. 11.
Figure 15:
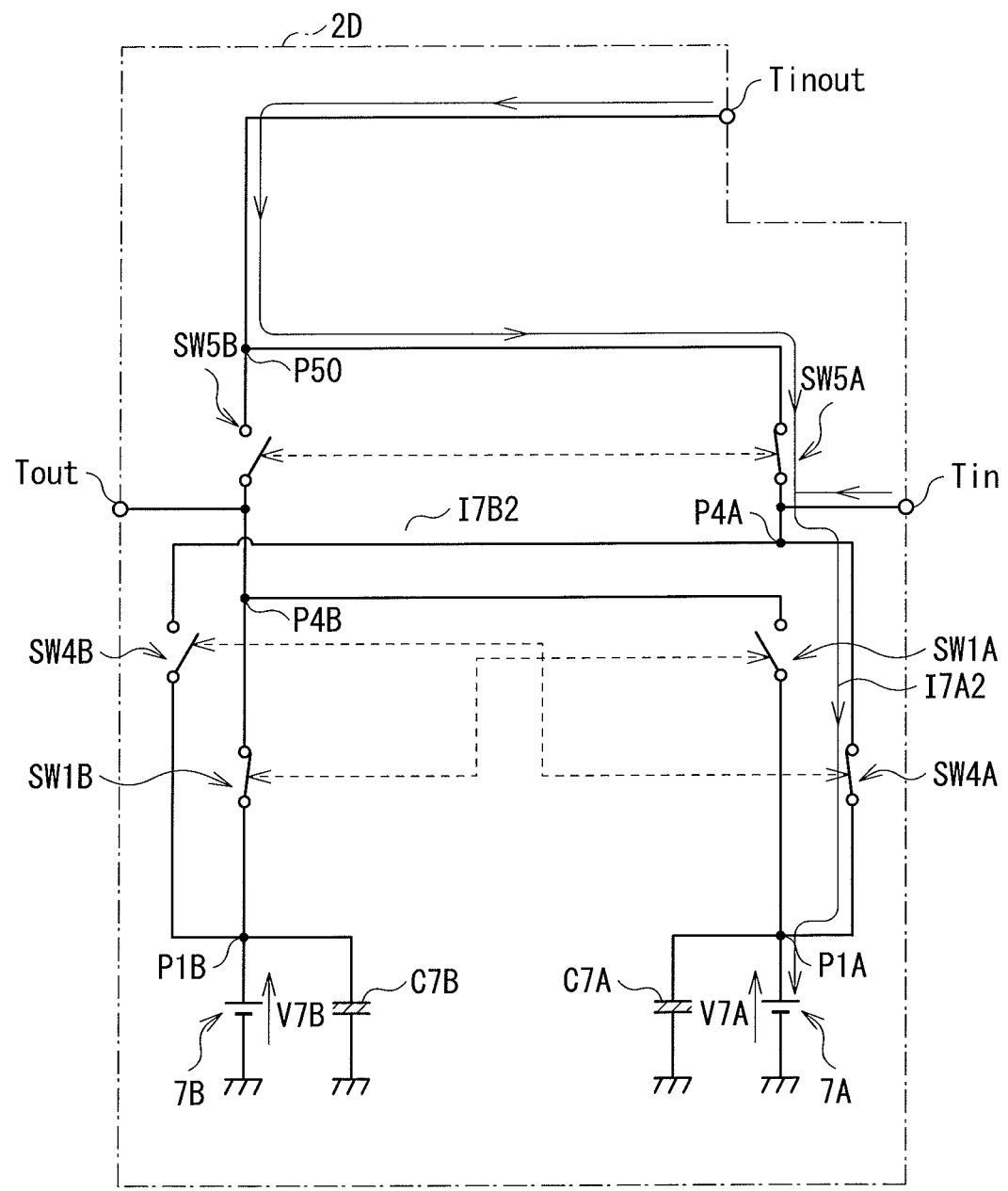
FIG. 15 is a schematic diagram for explaining another example of connection switching operation of the power supply device at the time of charge in the electricity supply section illustrated in FIG. 11.

Further, in charging, a charge current 17B2 is flown, for example, as illustrated in FIG. 14 during time period of V7A>V7B, while a charge current 17A2 is flown, for example, as illustrated in FIG. 15 during time period of V7A<V7B.

As described above, in this embodiment, the power supply device is composed of the secondary batteries 7A and 7B, and the control circuit section has a charge circuit section in addition to the discharge circuit section. Thus, only the secondary battery 7A having a higher inter-terminal voltage is linked at the time of discharge, and only the secondary battery 7B having a lower inter-terminal voltage is linked at the time of charge.

In addition, in this embodiment, a description has been given of the case that the charge exclusive terminal Tin, the discharge exclusive terminal Tout, and the charge/discharge dual purpose terminal Tinout are included. However, only the charge/discharge dual purpose terminal may be provided, or only the charge exclusive terminal Tin and the discharge exclusive terminal Tout may be provided.

Further, as in the second embodiment, two stage structure or three or more stage structure may be adopted.

4. Modification and Application Example

As above, the present invention has been described with reference to the first embodiment to the third embodiment. However, the present invention is not limited to the embodiments, and various modifications may be made.

Figure 16:
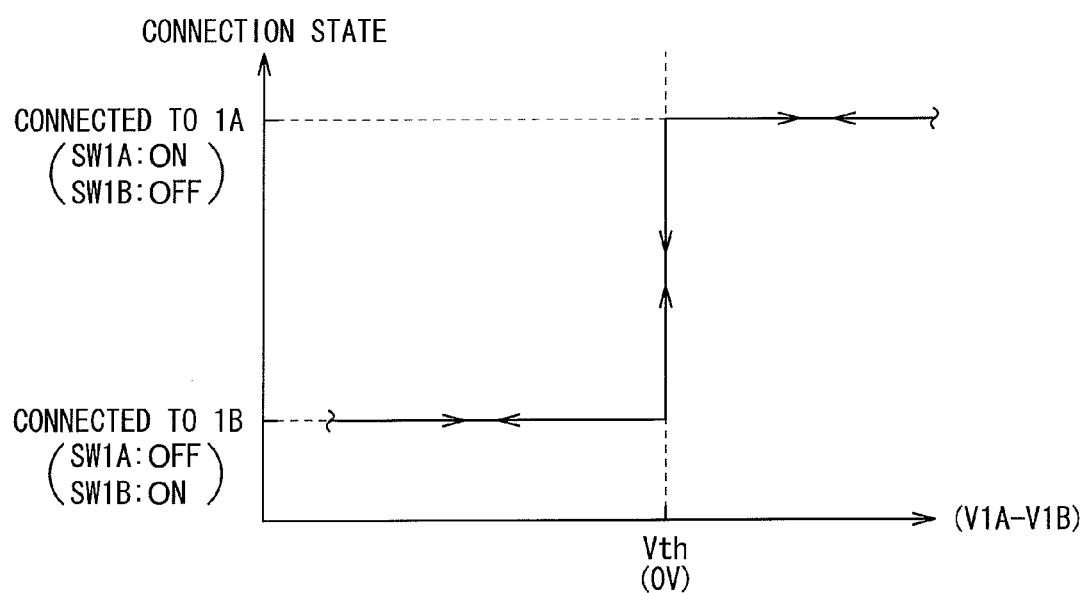
FIG. 16 is a schematic diagram for explaining an example of connection switching operation of a power supply device according to a modification of the present invention.

For example, in the foregoing embodiments, the description has been given of the case that as illustrated in FIG. 3, the threshold voltages in the difference between the inter-terminal voltages (V1A-V1B) in connection switching at the time when the difference between the inter-terminal voltages (V1A-V1B) is increased and at the time when the difference between the inter-terminal voltages (V1A-V1B) is decreased are Vthp and Vthm which are different values from each other. However, the present invention is not limited thereto. That is, in some cases, such hysteresis is not shown, and for example, as illustrated in FIG. 16, the threshold voltage Vth at the time when the difference between the inter-terminal voltages (V1A-V1B) is increased may correspond with the threshold voltage Vth at the time when the difference between the inter-terminal voltages (V1A-V1B) is decreased.

Figure 17:
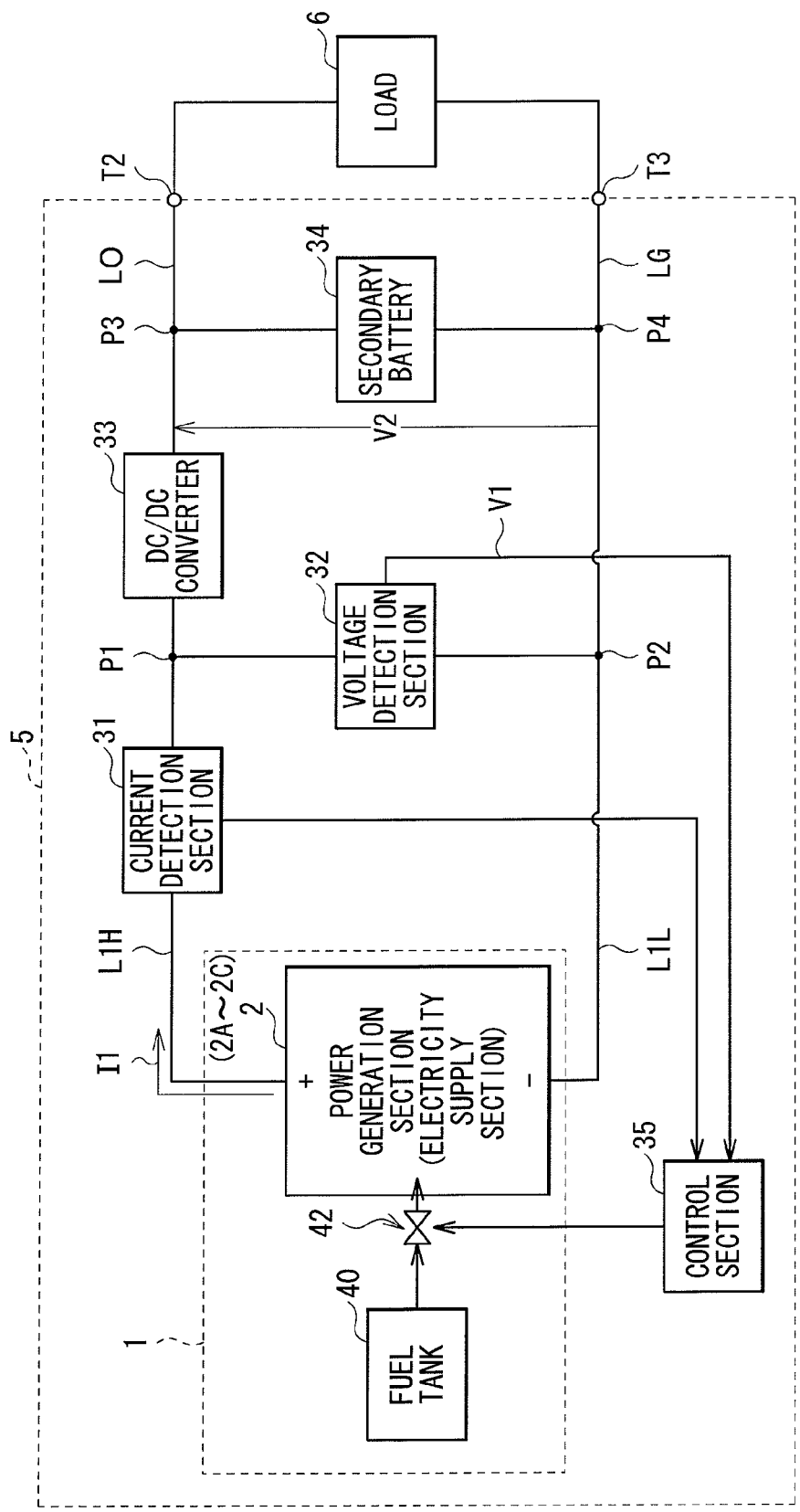
FIG. 17 is a block diagram illustrating a whole configuration example of a fuel cell system to which the power supply system of the present invention is applied.

Further, the power supply system of the present invention is applicable to a fuel cell system (fuel supply system 5) as illustrated in FIG. 17, for example. The fuel supply system 5 has a fuel cell 1, a current detection section 31, a voltage detection section 32, a voltage rise circuit 33, a secondary battery 34, and a control section 35. The fuel cell 1 has a power generation section 2 (or power generation sections 2A to 2C) as an electricity supply section, a fuel tank 40, and a fuel pump 42. In addition, in the fuel cell system 5, a fuel cell with a pulsative fuel supply amount may be used as the fuel cell 1 as a power generating device. This is because, in the case where the fuel supply amount is pulsative, electromotive force in the fuel cell is significantly increased or decreased. In the case where the present invention is applied to the pulsative fuel cell, the current can be actively extracted from where a fuel is abundant and thus a current is easily extracted.

Further, the power supply system of the present invention is also applicable to a solar cell system including a solar cell as a power generating device. This is because, in the case of the solar cell, if a specific cell is shaded, energy is not able to be extracted from the cell. In the case where the present invention is applied to such a solar cell system, electricity can be selectively extracted from where power generation is enabled in the case where solar cells are in the sun.

The power supply system of the present invention (for example, the foregoing fuel cell system 5) is able to be suitably used for a mobile electronic device such as a mobile phone, an electronic camera, an electronic databook, and a PDA (Personal Digital Assistants).

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A power supply system comprising:
a first switching element connected in series with a first power supply device;
a second switching element connected in series with a second power supply device;
a third switching element connected in series with the first power supply device;
a fourth switching element connected in series with the second power supply device; and a control circuit section including a comparator connected to the first and second power supply devices and an inverter connected in series between the first switching element and an output terminal of the comparator, wherein the control circuit section is configured to control an ON/OFF state of the first and second switching elements so that the first switching element is in an ON state and the second switching element is in an OFF state when an inter-terminal voltage of the first power supply device is greater than an inter-terminal voltage of the second power supply device, and the first switching element is in an OFF state and the second switching element is in an ON state when the inter-terminal voltage of the first power supply device is less than the inter-terminal voltage of the second power supply device, wherein the control circuit section is configured to apply a charge voltage to the first or second power supply device and control an ON/OFF state of the third and fourth switching elements so that the third switching element is in an ON state and the fourth switching element is in an OFF state when the inter-terminal voltage of the first power supply device is greater than an inter-terminal voltage of the second power supply device, and the third switching element is in an OFF state and the fourth switching element is in an ON state when the inter-terminal voltage of the first power supply device is less than the inter-terminal voltage of the second power supply device.

2. The power supply system of claim 1, further including:
a plurality of additional switching elements;
a plurality of additional power supply devices; and
at least one additional control circuit section, wherein the power supply system is arranged in a multistage structure so that the power supply device out of the first, the second, and the plurality of additional power supply devices having a highest inter-terminal voltage is selectively outputted.

3. The power supply system of claim 1, wherein at least one of the first and second power supply devices includes a lithium ion battery.

4. The power supply system of claim 1, wherein one or more capacitive elements are connected in parallel with at least one of the first and second power supply devices.

5. The power supply system of claim 1, wherein at least one of the first and second switching elements includes at least one of a field effect transistor (FET) and a relay.

6. The power supply system of claim 1, wherein at least one of the first and second power supply devices is at least one of a battery and a power generating device.

7. The power supply system of claim 1, wherein at least one of the first and second power supply devices includes a fuel cell.

8. The power supply system of claim 7, wherein a voltage provided by the fuel cell varies over time.

9. The power supply system of claim 1, wherein at least one of the first and second power supply devices includes a solar cell.

10. An electronic device comprising:
a power supply system including:
a first switching element connected in series with a first power supply device;
a second switching element connected in series with a second power supply device;
a third switching element connected in series with the first power supply device;
a fourth switching element connected in series with the second power supply device; and
a control circuit section including a comparator connected to the first and second power supply devices and an inverter connected in series between the first switching element and an output terminal of the comparator, wherein the control circuit section is configured to control an ON/OFF state of the first and second switching elements so that the first switching element is in an ON state and the second switching element is in an OFF state when an inter-terminal voltage of the first power supply device is greater than an inter-terminal voltage of the second power supply device, and the first switching element is in an OFF state and the second switching element is in an ON state when the inter-terminal voltage of the first power supply device is less than the inter-terminal voltage of the second power supply device, wherein the control circuit section is configured to apply a charge voltage to the first or second power supply device and control an ON/OFF state of the third and fourth switching elements so that the third switching element is in an ON state and the fourth switching element is in an OFF state when the first power supply device has an inter-terminal voltage that is greater than an inter-terminal voltage of the second power supply device, and the third switching element is in an OFF state and the fourth switching element is in an ON state when the inter-terminal voltage of the first power supply device is less than the inter-terminal voltage of the second power supply device.

11. The power supply system of claim 1, wherein the control circuit section is configured to control an ON/OFF state of the first and second switching elements so that the first switching element is in an ON state and the second switching element is in an OFF state when the inter-terminal voltage of the first power supply device is greater than the inter-terminal voltage of the second power supply device by a first predetermine threshold, and the first switching element is in an OFF state and the second switching element is in an ON state when the inter-terminal voltage of the first power supply device is less than the inter-terminal voltage of the second power supply device by a second predetermined threshold.

12. The electronic device of claim 10, further including:
a plurality of additional switching elements;
a plurality of additional power supply devices; and
at least one additional control circuit section, wherein the power supply system is arranged in a multistage structure so that the power supply device out of the first, the second, and the plurality of additional power supply devices having a highest inter-terminal voltage is selectively outputted.

13. The electronic device of claim 10, wherein at least one of the first and second power supply devices includes a lithium ion battery.

14. The electronic device of claim 10, wherein the control circuit section is configured to control an ON/OFF state of the first and second switching elements so that the first switching element is in an ON state and the second switching element is in an OFF state when the inter-terminal voltage of the first power supply device is greater than the inter-terminal voltage of the second power supply device by a first predetermine threshold, and the first switching element is in an OFF state and the second switching element is in an ON state when the inter-terminal voltage of the first power supply device is less than the inter-terminal voltage of the second power supply device by a second predetermined threshold.

15. A power supply system comprising:
a first switching element connected in series with a first battery;
a second switching element connected in series with a second battery;
a third switching element connected in series with the first battery;
a fourth switching element connected in series with the second battery;
a discharge circuit section configured to selectively output an inter-terminal voltage of the first or secondary battery and control an ON/OFF state of the first and second switching elements so that the first switching element is in an ON state and the second switching element is in an OFF state when the first battery has an inter-terminal voltage that is greater than an inter-terminal voltage of the second battery, and the first switching element is in an OFF state and the second switching element is in an ON state when the inter-terminal voltage of the first battery is less than the inter-terminal voltage of the second battery; and
a charge circuit section configured to selectively apply a charge voltage to the first or second battery and control an ON/OFF state of the third and fourth switching elements so that the third switching element is in an ON state and the fourth switching element is in an OFF state when the first battery has an inter-terminal voltage that is greater than an inter-terminal voltage of the second battery, and the third switching element is in an OFF state and the fourth switching element is in an ON state when the inter-terminal voltage of the first battery is less than the inter-terminal voltage of the second battery.

16. The power supply system of claim 15, further including:
a fifth switching element connected in series with the first and second switching elements; and
a sixth switching element connected in series with the third and fourth switching elements;
wherein, the control circuit section is configured to control an ON/OFF state of the fifth and sixth switching elements so that the fifth switching element is in an ON state and the sixth switching element is in an OFF state during a discharge operation of the first or second batteries, and the fifth switching element is in an OFF state and the sixth switching element is in an ON state during a charger operation of the first or second batteries.

* * * * *